United States Patent
Nagano (10) Patent No.: US 8,621,972 B2
(45) Date of Patent: Jan. 7, 2014

(54) BAND SAW BLADE

(75) Inventor: Yuji Nagano, Kanagawa (JP)

(73) Assignees: Amada Company, Limited, Kanagawa (JP); Amada Machine Tools Company, Limited, Kanagawa (JP)

(*) Notice: Subject to any disclaimer, the term of this patent is extended or adjusted under 35 U.S.C. 154(b) by 281 days.

(21) Appl. No.: 13/058,683

(22) PCT Filed: Aug. 7, 2009

(86) PCT No.: PCT/JP2009/064031
§ 371 (c)(1),
(2), (4) Date: Feb. 11, 2011

(87) PCT Pub. No.: WO2010/021253
PCT Pub. Date: Feb. 25, 2010

(65) Prior Publication Data
US 2011/0132168 A1 Jun. 9, 2011

(30) Foreign Application Priority Data
Aug. 20, 2008 (JP) ................................ 2008-211592

(51) Int. Cl.
B27B 33/06 (2006.01)
(52) U.S. Cl.
USPC .................................. 83/846; 83/835; 83/855
(58) Field of Classification Search
USPC ............................ 83/838, 788, 855, 846, 835
See application file for complete search history.

(56) References Cited

U.S. PATENT DOCUMENTS

| 193,985 | A | * | 8/1877 | McRae | 83/838 |
| 820,969 | A | * | 5/1906 | Grelck | 83/851 |

(Continued)

FOREIGN PATENT DOCUMENTS

| CN | 1207974 | 2/1999 |
| CN | 1278474 | 1/2001 |

(Continued)

OTHER PUBLICATIONS

Japan Office action, mail date is Dec. 4, 2012.

(Continued)

*Primary Examiner* — Sean Michalski
(74) *Attorney, Agent, or Firm* — Greenblum & Bernstein P.L.C.

(57) ABSTRACT

A band saw blade includes multiple saw teeth having a straight tooth and right and left set teeth, and also includes a gullet portion provided between the saw teeth. A rake surface of each of the saw teeth is provided with a chip curler portion formed into an arc shape at an entire range of approximately 90° to form a chip generated at the time of cutting a work into a small rolled shape before the chip comes into contact with a bottom portion of the gullet portion. A chip non-contact surface to be kept out of contact with the chip is formed to have either a flat surface or a convex surface between the chip curler portion and the bottom portion of the gullet portion, and a dent portion is formed between the chip non-contact surface and the gullet bottom portion, the dent portion recessed from the chip non-contact surface in an opposite direction to a moving direction of the band saw blade in order to increase a radius of a concave curved surface constituting a back side of the gullet bottom portion. A flat portion for dispersing stress concentration is provided at an innermost portion of the gullet portion.

7 Claims, 10 Drawing Sheets

(56) References Cited

U.S. PATENT DOCUMENTS

| | | | | |
|---|---|---|---|---|
| 869,574 | A | * | 10/1907 | Huther .................. 83/838 |
| 1,955,137 | A | * | 4/1934 | Paulsen ................. 83/852 |
| 2,126,382 | A | * | 8/1938 | Goff et al. ............. 83/661 |
| 2,394,035 | A | * | 2/1946 | Blum ..................... 83/838 |
| 2,826,941 | A | * | 3/1958 | Kolesh ................... 76/112 |
| 2,880,768 | A | * | 4/1959 | Kolesh ................... 83/661 |
| 4,232,578 | A | * | 11/1980 | Stellinger et al. ..... 83/661 |
| 5,249,485 | A | * | 10/1993 | Hayden, Sr. ........... 76/112 |
| 6,119,571 | A | * | 9/2000 | Hayden, Sr. ........... 83/661 |
| 6,601,495 | B2 | * | 8/2003 | Cranna ................... 83/848 |
| 6,834,573 | B1 | * | 12/2004 | Nakahara ............... 83/851 |
| 7,036,415 | B2 | * | 5/2006 | Tsujimoto .............. 83/661 |
| 7,174,823 | B2 | * | 2/2007 | Cranna ................... 83/848 |
| 7,568,416 | B2 | | 8/2009 | Tsujimoto |
| 7,661,347 | B2 | | 2/2010 | Nagano et al. |
| 8,113,100 | B1 | | 2/2012 | Cranna et al. |
| 2008/0121079 | A1 | | 5/2008 | Hashimoto et al. |
| 2011/0154970 | A1 | | 6/2011 | Oshibe et al. |

FOREIGN PATENT DOCUMENTS

| | | |
|---|---|---|
| CN | 1476363 | 2/2004 |
| EP | 0266022 | 5/1988 |
| JP | 62-277216 | 12/1987 |
| JP | 64-11708 A | 1/1989 |
| JP | 6-716 A | 1/1994 |
| JP | 06-000717 | 1/1994 |
| JP | 2000-263327 | 9/2000 |
| JP | 2003-334721 A | 11/2003 |
| JP | 2005-349512 A | 12/2005 |
| JP | 3870158 B2 | 1/2007 |
| JP | 2010-46732 | 3/2010 |
| WO | 2002/06020 A1 | 1/2002 |
| WO | 02/40233 | 5/2002 |

OTHER PUBLICATIONS

U.S. Appl. No. 13/059,289 to Katsuhiko Oshibe et al., which was filed on Feb. 16, 2011.
China Office action, mail date is Aug. 28, 2012.
Search report from E.P.O., mail date is Jan. 30, 2013.

* cited by examiner

CUTTING TRAVELING DIRECTION
OF SAW BLADE

| SAW BLADE | EXPLANATORY VIEW | SAMPLE NUMBER | TIME (Hr) | | BREAKAGE POSITION | LENGTH OF TOOTH BOTTOM STRAIGHT PORTION IN BREAKAGE PORTION (mm) |
|---|---|---|---|---|---|---|
| COMPARATIVE SAW BLADE | FIG. 9 | 1 | 1.00H | AVERAGE 1.09H | TOOTH BOTTOM | 0 |
| | | 2 | 1.14H | | TOOTH BOTTOM | 0 |
| | | 3 | 1.07H | | TOOTH BOTTOM | 0 |
| | | 4 | 1.14H | | TOOTH BOTTOM | 0 |
| EXAMPLE 2 | FIG. 8(a) AND FIG. 8(b) | 1 | 1.57H | AVERAGE 1.50H | TOOTH BOTTOM | 0 |
| | | 2 | 1.86H | | TOOTH BOTTOM | 0 |
| | | 3 | 1.43H | | TOOTH BOTTOM | 0 |
| | | 4 | 1.14H | | TOOTH BOTTOM | 0 |
| EXAMPLE 3 | FIG. 10 | 1 | 1.71H | AVERAGE 1.84H | TOOTH BOTTOM | 0.2 |
| | | 2 | 2.00H | | TOOTH BOTTOM | 0.2 |
| | | 3 | 1.79H | | TOOTH BOTTOM | 2.7 |
| | | 4 | 1.86H | | TOOTH BOTTOM | 0.5 |

BAND SAW BLADE

TECHNICAL FIELD

The present invention relates to a band saw blade configured to cut a work made of a metallic material, and more specifically to a band saw blade capable of excellently discharging chips generated at the time of cutting a work and of avoiding early body breakage.

BACKGROUND ART

Band saw machines have heretofore been used as devices for cutting large work pieces made of metal, for example. Band saw blades frequently used in these band saw machines are so-called bi-metal band saw blades which use as materials high-speed tool steel or cemented carbide for blade edges and strong spring steel for body portions.

In order to achieve more efficient cutting, the following bi-metal saw blades have been put into practical use: a variable pitch saw blade including tooth tips at multiple different pitches to reduce cutting noise; a kerf-dispersing type tooth-shape saw blade configured to generate smaller chips to reduce cutting resistance by setting such different set widths that the set width for a tooth having a smaller tooth height (a distance from a reference position to a tooth tip) is set larger; a saw blade having a tooth tip shape in which the tooth tip is provided with a chip curler for improving discharging efficiency of chips; and the like.

Figure 1:
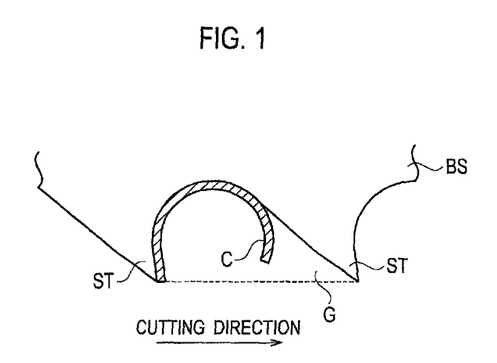
FIG. 1 is an explanatory view of a conventional saw blade.

As for cutting with the band saw machine, a chip C is generated and attached to a tooth tip when a cutting object made of metal is cut with a band saw blade BS which includes: multiple saw teeth ST having straight teeth as well as right and left set teeth; and gullet portions G provided between the saw teeth ST, as shown in FIG. 1. The attached chip C is forcibly knocked off with a wire brush provided on the band saw machine and the chip thus removed and dropped off is discharged to a dedicated box outside the band saw machine by use of a chip conveyor provided to the band saw machine.

Here, in the case of cutting a cutting object such as stainless steel which has ductility and has lower thermal conductivity than mild steel or in the case of performing high-speed cutting, the chip C generated along a rake surface of the cutting blade ST is easily attached to the rake surface due to a high friction heat on the rake surface, as shown in FIG. 1. By repeating this action, the chips are tightly attached and eventually become irremovable with the wire brush. Hence there is a problem that clogs occur inside the gullets G and adversely affect precision of a cut surface, damages on the tooth tips of the saw blade, and the like.

In addition, when a largely curled chip C as shown in FIG. 1 is discharged by use of the chip conveyor, there is a problem that the chip gets stuck to the chip conveyor, and thus cannot be discharged.

To solve the above-mentioned problems, there are disclosed band saw blades having a chip curler portion provided to a rake surface of a saw tooth. The related techniques have been disclosed in Japanese Patent Application Laid-Open No. Hei 6 (1994)-716 (Patent Document 1), Japanese Patent Application Laid-Open No. 2005-349512 (Patent Document 2), Japanese Patent No. 3870158 (Patent Document 3), and Japanese Patent Application Laid-Open No. 2003-334721 (Patent Document 4).

Figure 2:
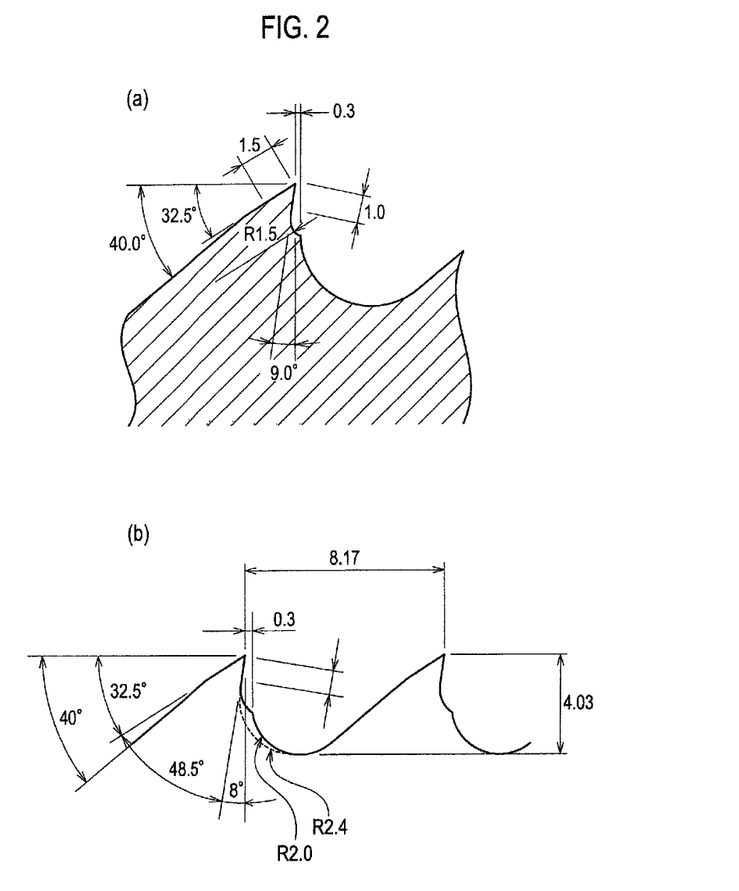
FIGS. 2(a) and 2(b) are explanatory views of a saw tooth according to Patent Document 1.

FIG. 2(a) shows an embodiment disclosed in FIG. 3 of Patent Document 1. This has been proposed to generate effectively curled chips, and is a device of a typical saw blade having a chip curler provided to a tooth tip.

When high-speed cutting is carried out by using the saw blade thus configured, the chips are made compact and an effect against clogging is exerted. Moreover, the chips can be discharged without any problem by using the chip conveyor provided to the band saw machine.

Based on the description of the specification, tooth angles of this saw blade have general design values: a rake angle of 9°; and a tooth angle of 48.5°. Meanwhile, the chip curler has a shape protruding from the tooth tip in a saw blade cutting traveling direction (rightward in FIG. 2(a)) by an amount of 0.15 to 1.5 mm. Accordingly, when a comparison is made as shown in FIG. 2(b) with reference to dimensions of this saw blade, it is understood that a curvature radius of a curved portion at a tooth bottom is apparently smaller than that of a saw blade designed with the same tooth angle but without the chip curler (a comparison between R2.0 and R2.4).

In FIG. 2(b), a distance between the tooth tips (a pitch) is 8.17 mm. This dimension is within pitches from 6.35 mm to 8.47 mm of a variable pitch ¾ (a combination of multiple pitches indicating the number of teeth per inch, which includes the pitches corresponding to 4 teeth at maximum and 3 teeth at minimum) most frequently used in band saw blades. If the pitch becomes even smaller, the curvature radius of the curved portion at the tooth bottom, i.e., a curvature radius of a backside of a gullet bottom portion becomes smaller.

Figure 6:
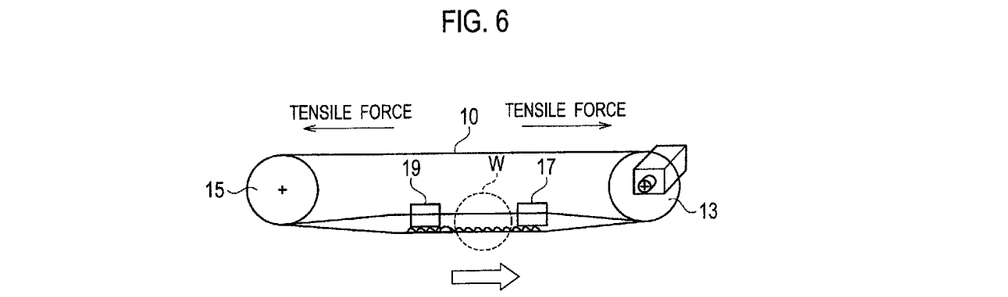
FIG. 6 is a schematic explanatory view of a band saw machine configured to attach thereto a band saw blade based on the present invention and to use the band saw blade.

Cutting with a band saw machine is carried out as follows. Specifically, as shown in FIG. 6, a band saw blade 10 under a tensile force (tensional force) applied by two wheels 13 and 15 is twisted upward at a central portion by saw blade guides 17 and 19 to direct tooth tips toward a work. Then the band saw blade 10 is rotated with rotation of the driving wheel 13 while a housing of the band saw machine is lifted down at the same time.

Here, the band saw blade 10 repeatedly receives: tensile stress due to the tensile force by the two wheels; bending stress due to the twisting actions by the wheels and the saw blade guides 17 and 19; and cutting resistance from the work.

Accordingly, the band saw blade around the tooth bottoms receives the concentrated stresses, whereby a body portion may cause breakage (early body breakage) even though the tooth tips are still capable of cutting. Moreover, in recent years, speeding-up of a cutting process has increased the tensile forces on the band saw machine and brings about a cutting environment where the breakage is more likely to occur. As a countermeasure for these problems, a method of relaxing the concentrated stress by increasing the curvature radius of the curved portion at the tooth bottom is adopted.

However, the saw blade in the shape with the chip curler provided to the rake surface has the smaller curvature radius of the curved portion at the tooth bottom than the conventional band saw blade having no chip curler as described above in FIG. 2(b), and therefore easily causes the early breakage.

Figure 3:
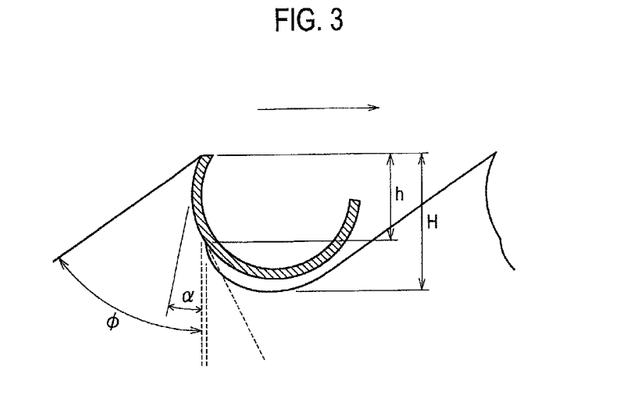
FIG. 3 is an explanatory view of a saw tooth according to Patent Document 2.

FIG. 3 shows an embodiment disclosed in Patent Document 2.

This is a proposal to discharge chips smoothly without causing chipping while providing no reinforcing portion to a tooth tip.

According to this proposal, a rake surface is provided with a shape like a chip curler. Based on the description of the specification, this proposal aims to prevent adhesion of a chip by reducing contact between the chip and the rake surface and thereby to smooth discharge of the chip by use of the wire brush, but does not provide a proposal to make the chip smaller and compact. In high-speed cutting with this configuration, the gullet is filled and clogged with a chip having a large diameter corresponding to the size of the gullet whereby the cut surface becomes coarse. Moreover, the problem of incapability of discharge by using the chip conveyor provided to the band saw machine is not solved.

In addition, as shown in FIG. 2(b), this band saw blade also has a smaller curvature radius of the curved portion at the tooth bottom than the conventional band saw blade having no chip curler, and therefore easily causes the early breakage.

Figure 4:
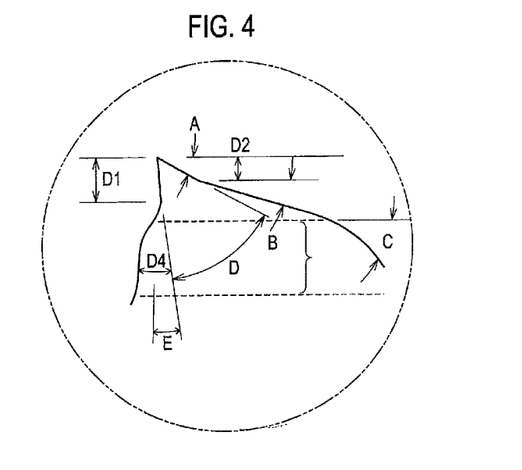
FIG. 4 is an explanatory view of a saw tooth according to Patent Document 3.

FIG. 4 shows an embodiment disclosed in Patent Document 3.

This is a proposal to enhance strength against chipping by increasing a length dimension of a bi-metal boundary portion, i.e., a portion where the blade and the body are welded together.

Although a portion of the rake surface is formed into a shape like a chip curler, no description for making chips compact is found in the description of the specification and the effect thereof is therefore unknown.

In addition, this band saw blade also has a smaller curvature radius of the curved portion at the tooth bottom than the conventional saw blade, and therefore easily causes the early breakage.

Figure 5:
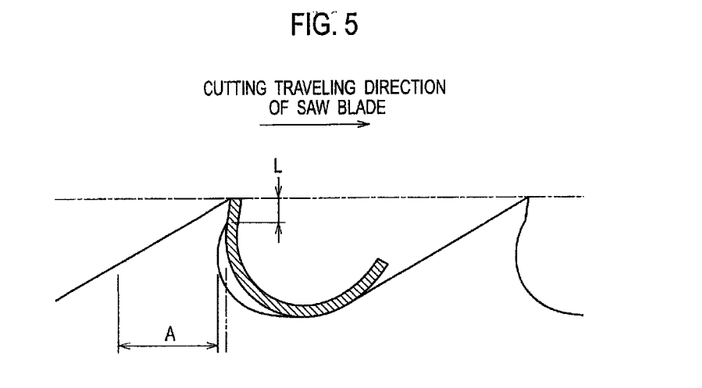
FIG. 5 is an explanatory view of a saw tooth according to Patent Document 4.

FIG. 5 shows an embodiment disclosed in Patent Document 4.

This proposed embodiment includes a first rake surface and a second rake surface. In order to prevent a chip along the first rake surface from coming into contact with the second rake surface, the second rake surface extends from a junction portion with the first rake surface in an opposite direction to a cutting traveling direction and connects to a tooth bottom. This configuration makes the chip less likely to adhere to the tooth bottom and easily removable with the wire brush or the like.

According to this configuration, the rake surfaces include no shape like a chip curler. The description of the specification includes no description for making chips compact.

Moreover, this saw blade also lacks the description for increasing a curvature radius of the curved portion at the tooth bottom connecting the rake surface to the tooth bottom.

The band saw blade with a shape having the chip curler provided to the rake surface includes a protrusion in a direction of the rake surface, unlike the conventional band saw blade, owing to the characteristic shape thereof (see FIG. 2(b)). Accordingly, the curvature radius of the curved portion at the tooth bottom is small and the early breakage easily occurs. However, in order to avoid concentration of the stress on the curved portion at the tooth bottom on the rake surface of the tooth tip for preventing the early body breakage, it is necessary to increase the curvature radii of the curved portions at the tooth bottoms on all the rake surfaces of the tooth tips provided with the chip curlers.

PRIOR ART DOCUMENTS

Patent Documents

Patent Document 1: Japanese Patent Application Laid-Open No. Hei 6 (1994)-716
Patent Document 2: Japanese Patent Application Laid-Open No. 2005-349512
Patent Document 3: Japanese Patent No. 3870158
Patent Document 4: Japanese Patent Application Laid-Open No. 2003-334721

DISCLOSURE OF THE INVENTION

Technical Problem

This invention has been made to solve the above-described problems. Accordingly, an object thereof is to provide a band saw blade capable of excellently discharging chips, dispersing concentration of stress applied to a bottom of a gullet portion, and thereby preventing early body breakage.

Technical Solution

In order to achieve the above object, a first aspect of the present invention is to provide a band saw blade comprising: a plurality of saw teeth including a straight tooth and right and left set teeth; and a gullet portion provided between the saw teeth, wherein a rake surface of each of the saw teeth is provided with a chip curler portion formed into an arc shape at an entire range of approximately 90° to form a chip generated at the time of cutting a work into a small rolled shape before the chip comes into contact with a bottom portion of the gullet portion, and a dent portion is provided between the chip curler portion and the bottom portion of the gullet portion, the dent portion recessed from an end of the chip curler portion in an opposite direction to a moving direction of the band saw blade in order to increase a radius of a concave curved surface constituting a back side of the gullet bottom portion.

Moreover, in order to achieve the above object, a second aspect of the present invention is to provide a band saw blade comprising: a plurality of saw teeth including a straight tooth and right and left set teeth; and a gullet portion provided between the saw teeth, wherein a rake surface of each of the saw teeth is provided with a chip curler portion formed into an arc shape at an entire range of approximately 90° to form a chip generated at the time of cutting a work into a small rolled shape before the chip comes into contact with a bottom portion of the gullet portion, a chip non-contact surface configured to be kept out of contact with the chip is formed to have any of a flat surface and a convex surface between the chip curler portion and the bottom portion of the gullet portion, and a dent portion is formed between the chip non-contact surface and the gullet bottom portion, the dent portion recessed from the chip non-contact surface in an opposite direction to a moving direction of the band saw blade in order to increase a radius of a concave curved surface constituting a back side of the gullet bottom portion.

A third aspect of the present invention dependent on the first aspect or the second aspect lies in that a flat portion configured to disperse stress concentration is provided at an innermost portion of the gullet portion in the band saw blade.

Advantageous Effects

According to the first to third aspects of the present invention, the chip to be generated at the time of cutting (severing) a work is formed in a state of being curled with an extremely smaller diameter than the size of the gullet portion. Thus, chips can be discharged excellently while concentration of stress applied to a bottom of a gullet portion can be dispersed, and thereby early body breakage can be prevented.

BRIEF DESCRIPTION OF THE DRAWINGS

[FIG. 1]

[FIG. 2]

[FIG. 3]

[FIG. 4]

[FIG. 5]

[FIG. 6]

[FIG. 7]

[FIG. 8]

[FIG. 9]

[FIG. 10]

[FIG. 11]

[FIG. 12]

BEST MODES FOR CARRYING OUT THE INVENTION

Embodiments of the present invention will be described below by using drawings.

Referring to FIGS. 7(a) to 7(c), a band saw blade 1 according to a first embodiment of the present invention includes multiple saw blades, namely, straight teeth 5, right set teeth 7A and 7B, and left set teeth 9A and 9B, which are provided on one side of a body portion 3 in the same manner as a general band saw blade. Moreover, a gullet portion 11 is provided in each space between the saw blades 5, 7A, 7B, 9A, and 9B. Pitches P1 to P5 between the saw blades 5, 7A, 7B, 9A, and 9B are shown in dimensions different from one another. However, the number of saw teeth in one group of the band saw blade 1 is not limited to five but may be in an arbitrary number equal to or more than three. Moreover, the pitches P1 to P5 between the saw teeth may have desired dimensions, or the pitches may be set equal to one another as appropriate, for example.

Regarding each of the saw teeth, a rake angle θ, a tooth angle β, and a clearance angle α satisfy a relationship of θ+β+α=90°. Meanwhile, although the rake angle θ and the tooth angle β are not particularly limited, it is preferable to set 10° θ, and 40≤β as a configuration to achieve both of a cutting resistance reduction effect and abrasion resistance.

As shown in FIG. 7(c), each saw tooth includes a rake surface 13 at the rake angle θ. One side of the rake surface 13 closer to a bottom portion (a bottom surface) 15 in the gullet portion 11 is provided with an arc-shaped chip curler portion 17 connecting to the rake surface 13. The chip curler portion 17 is configured to form chips, which are continuously generated at the time of cutting (severing) a work, into small curled shapes before the chips come into contact with the bottom portion 15 of the gullet portion 11. A radius of the chip curler portion 17 is equal to r.

The radius r of the chip curler portion 17 is set at a range within 10%±0.5 mm of the pitch encompassing the chip curler portion 17. Specifically, the radius r of the chip curler portion 17 of the tooth 7A that fauns the gullet at the pitch P1 is set at a range within (P1×0.1)±0.5 mm while a range within (P2×0.1)±0.5 mm is applied to the tooth 9A that forms the gullet at the pitch P2, and likewise for P3 and so on, for example.

This means that the radius r of the chip curler portion 17 becomes larger as the tooth tip pitch becomes larger. Hence the optimum dimensions for various tooth tip pitches can be set by the above-described setting.

In the above description, the radius r of the chip curler portion 17 is set by using the individual pitch. However, in the case of a single band saw blade, an average value of the pitches may be used to make the setting.

Specifically, in the example shown in FIGS. 7(a) to 7(c), the average pitch is obtained by dividing a group length Pt of the tooth tip pitches by 5. Accordingly, this value is used instead of the above-mentioned values P1, P2, and the like. In this way, the radii r of the chip curler portions 17 of all the tooth tips become equal to one another even in the case of the variable pitch, while there is not so much of a difference in advantageous effect even in this way. Since implementation becomes easier, cost reduction can be achieved.

A fan angle φ of an arc of the chip curler portion 17 is set at a range within 90°±25°. In short, this is a length which is around a quarter as long as a circumference of a circle having the radius r. That is, the chip curler portion 17 is formed into an arc shape at a range of about 90° from a contact point of the rake surface 13 and the chip curler portion 17.

Incidentally, chips to be continuously generated at the time of cutting a work flow along the rake surface 13 and reaches the chip curler portion 17, and then is formed into a curled state by being guided by the arc-shaped chip curler portion 17.

Figure 7:
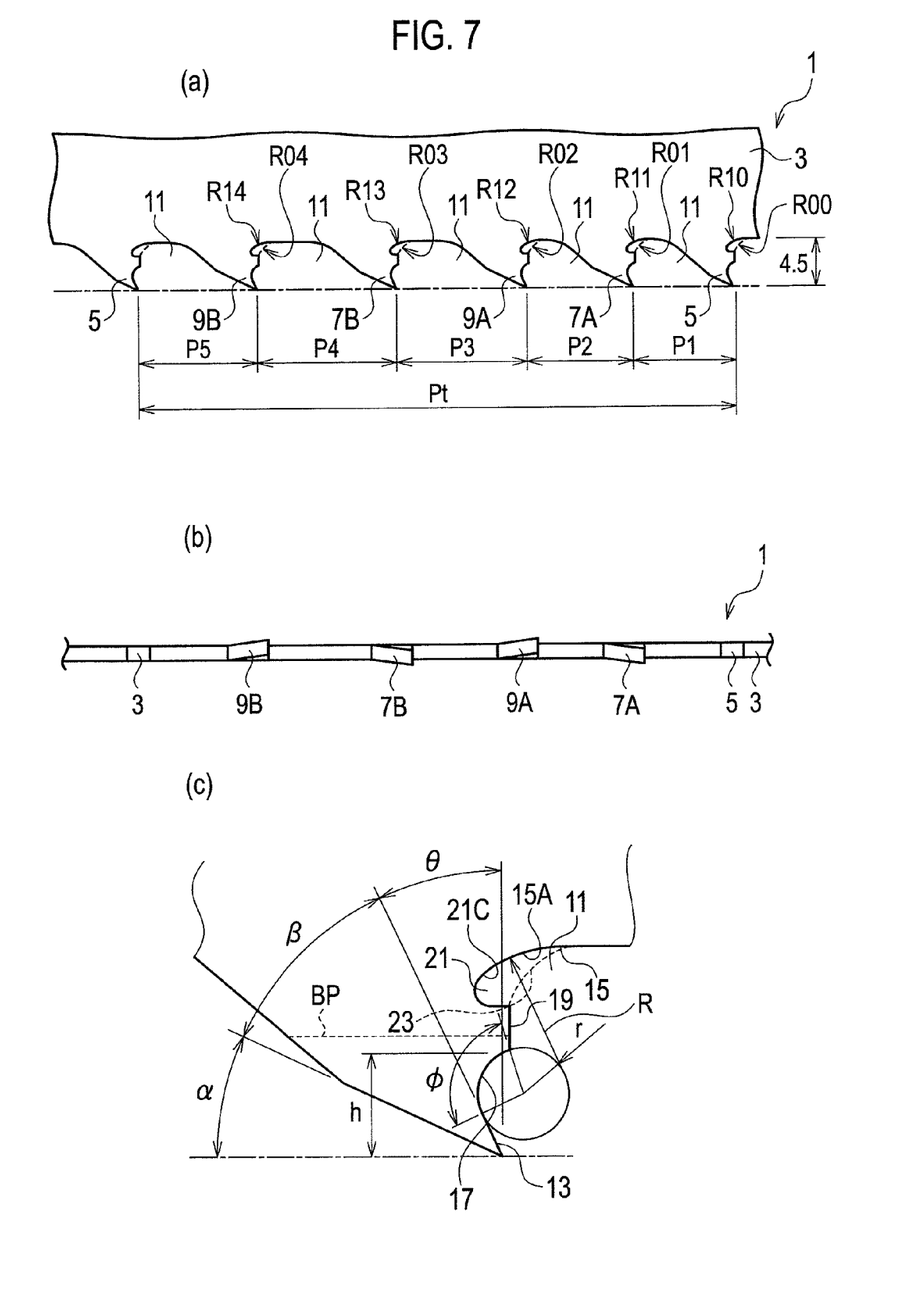
FIGS. 7(a) to 7(c) are explanatory views showing a configuration of a band saw blade according to an embodiment of the present invention.

A chip non-contact surface 19 having either a flat surface or a convex surface configured to be kept out of contact with the chip that is curled into a spiral shape by the chip curler portion 17 is formed between the chip curler portion 17 and the bottom portion 15 of the gullet portion 11. Moreover, a dent portion 21 is formed between the chip non-contact surface 19 and the bottom portion 15 of the gullet portion 11, and is recessed from the chip non-contact surface 19 in an opposite direction to a moving direction or a traveling direction (rightward in FIG. 7) of the band saw blade 1 in order to increase a radius R of a concave curved surface at a portion of a gullet bottom portion 15A close to the chip non-contact surface 19 (a portion on a back side of the gullet bottom portion viewed in the traveling direction of the band saw blade).

Therefore, the gullet bottom portion 15A can be formed into the curved surface which smoothly comes into contact with a curved surface 21C at the dent portion 21 directed toward the bottom portion 15 of the gullet portion 11. Hence the curvature radius R of the concave curved surface 21C that forms the back side of the gullet bottom portion 15A can be made larger than the curvature radius of an imaginary connection surface 23 for smoothly connecting the chip non-contact surface 19 to the bottom portion 15 of the gullet portion 11.

Incidentally, a dimension h from an intersection of the arc of the chip curler portion 17 and the chip non-contact surface 19 to a tooth tip is set at a range within (2r×1.1)±(2r×1.1)×0.2, i.e., (2r×1.1)±20%. This is a margin considered as 2r corresponding to a diameter of the chip regarded as being rolled one round after curled by the arc portion defined by the radius r of the chip curler portion 17 and the fan angle φ plus the thickness of the chip. If the dimension h is too small as compared to the radius r, the chip curler portion fails to roll the chip and causes clogging. On the other hand, if the dimension h is too large as compared to the radius r, the chip is cooled down before the chip reaches the chip curler portion whereby it is difficult to curl the chip. Therefore, the dimension h is desirably set at the range within (2r×1.1)±20%.

Incidentally, the fan angle φ of the chip curler portion 17 is set at the range within 90°±25°. Specifically, the chips shaved off by the tooth tip of the saw tooth at the time of cutting the work continuously flow to the chip curler portion 17 along the rake surface 13 and a curvature of an end portion for spirally rolling the chip is determined by the chip curler portion 17 in relation to the radius r and the fan angle φ. Here, if the fan angle φ is smaller than (90°−25°), there is a problem that it is not possible to curl sufficiently and the chips cause irregularities on a cut surface. Meanwhile, if the fan angle φ is greater than (90°+25°), there is a problem that the chips only remain inside the fan angle whereby an effective gullet is reduced in size and causes clogging as a consequence. Hence the fan angle φ is desirably set at the range within 90°±25°.

As it is understood from the description above, in order to achieve compact curling of the chips generated at the time of a cutting process on the work by using the band saw blade 1, it is desirable to set the radius r and the fan angle φ of each of the chip curler portions 17 so as to correspond to the dimension of the pitch (or the average pitch) P of the tooth tip of the saw tooth, and to set the height dimension h of the tooth tip so as to correspond to the radius r.

The band saw blade shown in FIGS. 7(a) to 7(c) represents the aspect of the band saw blade provided with the chip curler of the above-described specifications, which is configured to improve a body fatigue life by increasing the curvature radii of the curved portions at the tooth bottoms. Assuming that curvature radii of curved portions at tooth bottoms (corresponding to the imaginary connection surfaces 23 as described above) of a conventional saw blade provided with chip curlers are R00, R01, R02, R03, and R04, respective curvature radii R10, R11, R12, R13, and R14 with the increased curvature radii of the curved portions at the tooth bottoms according to this embodiment satisfy R00<R10, R01<R11, R02<R12, R03<R13, and R04<R14.

In this way, even in the case of the band saw blade with a shape having the rake surface provided with the chip curler, the curvature radius of the curved portion at the tooth bottom can be made sufficiently large as compared to that of the conventional saw blade provided with the chip curler. Hence it is possible to solve the problems of the prior art, namely, to prevent occurrence of the early breakage and to enhance the body fatigue life.

Specifically, at the time of cutting (severing) the work by using the band saw blade 1 having the above-described configuration, the chips continuously generated at the time of the cutting move to the chip curler portion 17 along the rake surface 13 of the saw tooth, and are then rolled spirally into small pieces by the chip curler portion 17 so as to correspond to the radius of the chip curler portion 17. The size of the chips spirally rolled by the chip curler portion 17 is extremely small as compared to the size of the gullet portion 11. Accordingly, the multiple chips can stay inside the gullet portion 11 at the same time without being clogged at the chip curler portion 17. Moreover, since the chips are spirally rolled into the small pieces, the chips can be discharged smoothly and thereby a discharge performance can be improved.

Moreover, according to the above-described configuration, the band saw blade 1 is subjected to tensile forces from a driving wheel and a driven wheel of a band saw machine and is twisted upward by saw blade guides, and moreover, is repeatedly subjected to bending actions so as to be curved by a thrust force (a reactive force of the cutting resistance in a cutting direction) at the time of cutting the work. However, since the curvature radius R of the gullet bottom portion 15A in the gullet portion 11 of the band saw blade is formed larger than the curvature radius of the imaginary connection surface 23 in the conventional case, it is possible to relax stress concentration and thereby to prevent the early breakage of the body portion.

A set starting position BP of the right and left set teeth 7A, 7B, 9A, and 9B in the band saw blade 1 is provided between the chip curler portion 17 and the dent portion 21 so as to be located at a portion of the chip non-contact surface 19. Accordingly, a length of a bent line after setting the right and left set teeth 7A, 7B, 9A, and 9B becomes longer than a length of a bent line of saw tooth (a conventional general saw tooth) having a structure including no chip curler portion 17. Therefore, it is possible to increase rigidity against component forces in a right-to-left direction applied to the right and left set teeth 7A, 7B, 9A, and 9B at the time of cutting the work, to prevent inward displacement of the right and left set teeth 7A, 7B, 9A, and 9B, and thereby to perform cutting more accurately.

FIGS. 8(a) and 8(b) illustrate a second example which shows the embodiment of the present invention more concretely.

A variable pitch band saw blade including five types of tooth tip pitches in a range from 9.4 to 13.0 mm is used therein. This is a standard pitch among saw blades sold by Amada Co., Ltd. and is indicated as ⅔P. Specifically, the ⅔P (pitch) represents distances between tooth tips including the minimum number of teeth equal to 2 and the maximum number of teeth equal to 3 per inch (25.4 mm), and therefore represents a variable pitch saw blade having the distances between the tooth tips in a range from about 8.5 mm (25.4/3=8.5) to 12.7 mm (25.4/2=12.7).

As for the tooth angle, the rake angle is set to 25° while the tooth angle is set to 40°, for example.

Moreover, a dimension (tooth heights) from the tooth bottom to the tooth tip is set constant to 4.5 mm.

The radius r and the fan angle φ of the chip curler, and the dimension h from an intersection of the chip curler arc and either an arc or a straight portion extending from the tooth bottom side, to the tooth tip are respectively set to the following numerical values.

The radius r of the chip curler
Based on 10%±0.5 mm of the pitch,
the average pitch of the respective pitches 55.4÷5=11.1 mm
11.1×0.1=1.1 mm, 1.1−0.1=1.0 mm
the same value is applied to the respective teeth
The fan angle φ of the chip curler
The value is set to 95° based on 90°±25°
The dimension h from the intersection of the chip curler arc and either the arc or the straight portion extending from the tooth bottom side, to the tooth tip
Based on (2r×1.1)±20%, the value is set to
2×1.0×1.1=2.2 mm, 2.2×1.05 (5%)=2.3 mm.

Further, the chip non-contact surface is defined as a flat surface directed perpendicularly toward the tooth bottom and a length in the perpendicular direction to the tooth bottom is set to 0.9 mm. There is a straight portion extending from an ending portion of the chip non-contact surface in the opposite direction of the cutting traveling direction of the saw blade. The curvature radius of the curved portion at the gullet bottom portion coupled with the straight portion extending in the opposite direction of the cutting traveling direction of the saw blade and the curved portion extending from the tooth bottom is set to 4.0 mm.

Moreover, the bottom portion 15 of the gullet portion 11 between the saw teeth 5 and 7 is formed into a structure without a straight portion (a flat portion) while a straight portion of 0.5 mm is formed at the bottom portion 15 of the gullet portion 11 between the saw teeth 7A and 9A. Then, the bottom portions 15 of other gullet portions 11 are configured to include straight portions of 2.7 mm, 3.6 mm, and 1.6 mm as shown in FIG. 8(*a*).

According to the above-described configuration, it is possible to effectively relax stress concentration at the portions where the straight portions (the flat portions) are provided at the bottom portions 15 in the gullet portions 11, and to exert similar effects to the above-described embodiment.

Figure 8:
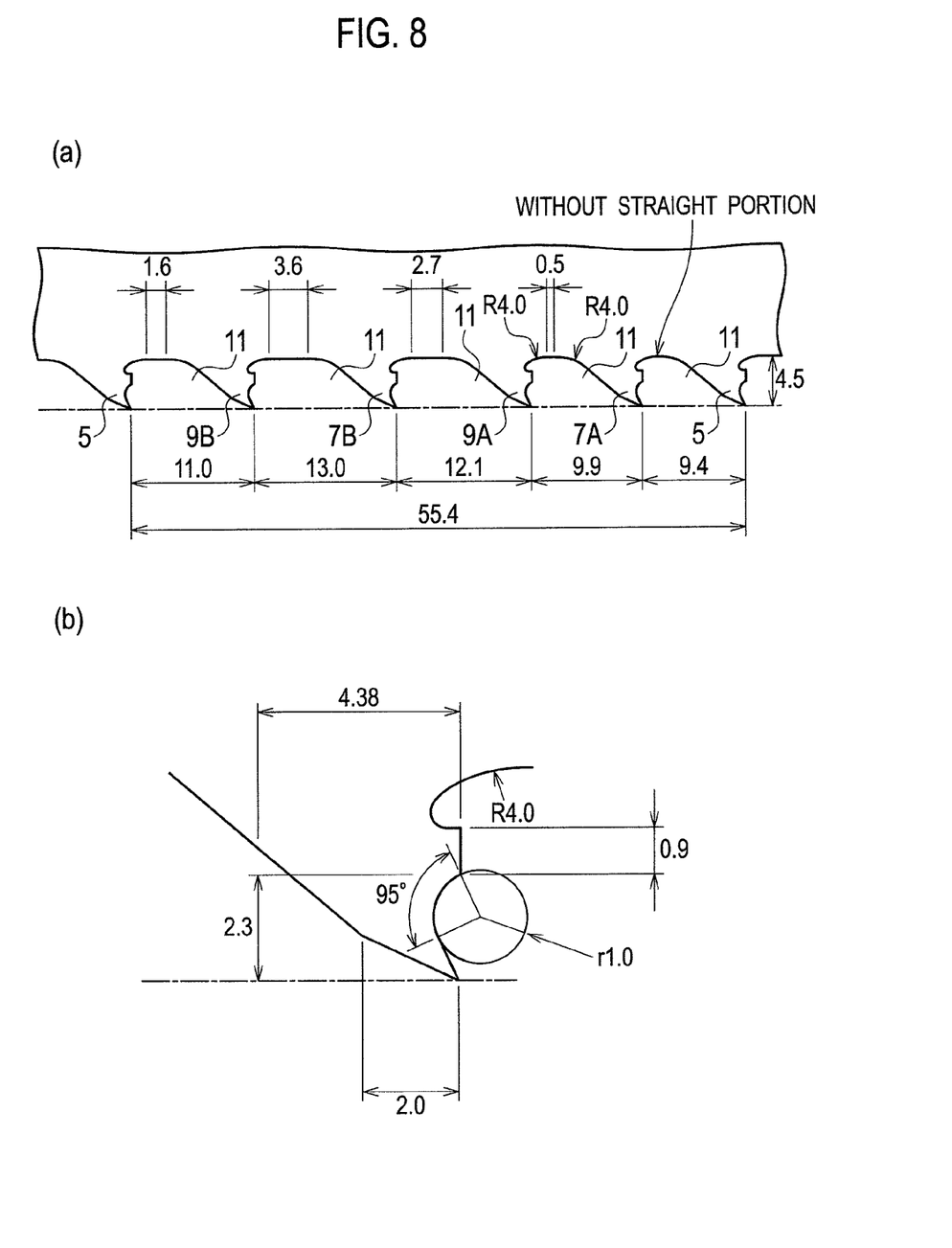
FIGS. 8(a) and 8(b) are explanatory views showing a concrete example of a band saw blade according to the first example of the present invention.
Figure 9:
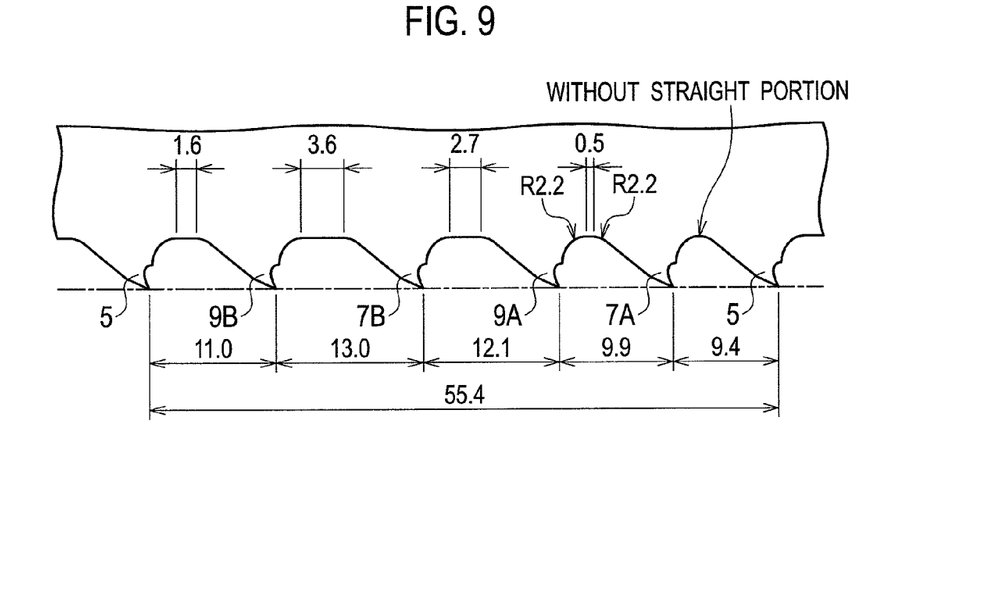
FIG. 9 is an explanatory view of a comparative band saw blade.

Here, a band saw blade shown in FIG. 9 is manufactured in accordance with the same specifications as those of the band saw blade shown in FIG. 8(*a*) and FIG. 8(*b*) in order to check the effects of the band saw blade according to the embodiment of the present invention. Specifically, a tooth tip shape configured to maximize a curvature radius of a tooth tip tooth bottom curved portion in a saw blade provided with the conventional chip curler is illustrated therein. A curvature radius of a tooth bottom curved portion in the band saw blade is determined by a chip non-contact surface, a tooth bottom and a clearance surface, and the curvature radius R of the tooth bottom portion is 2.2 mm.

Accordingly, the curvature radius of the band saw blade shown in FIG. 8(*a*) and FIG. 8(*b*) is multiplied by about 1.8 times (4/2.2=1.8), which is sufficiently large.

Figure 10:
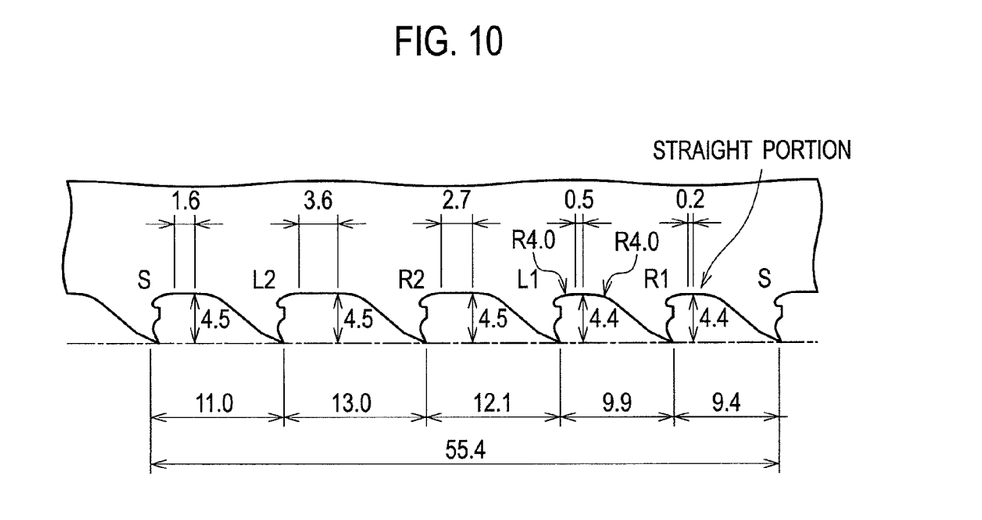
FIG. 10 is an explanatory view showing a concrete example of a band saw blade according to a second example of the present invention.

Further, a band saw blade shown in FIG. 10 is manufactured as a third example. A difference from the band saw blade shown in FIG. 8(*a*) and FIG. 8(*b*) is that tooth heights of the teeth having the pitches between the tooth tips of 9.9 mm and 9.4 mm are reduced to 4.4 mm so as to set the minimum length of the tooth bottom curved portions to 0.2 mm or more.

Figure 11:
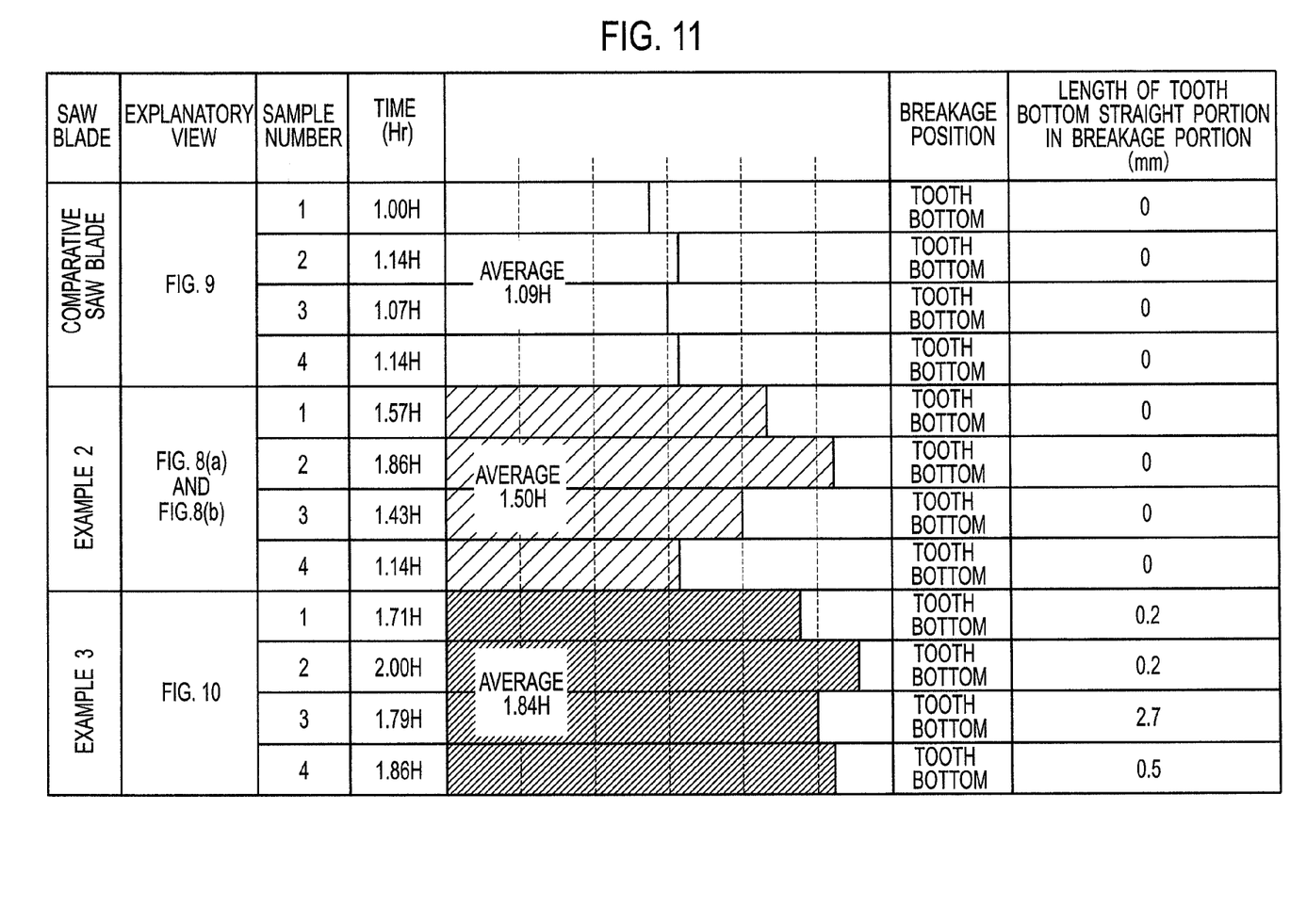
FIG. 11 is a table showing results of experiments.

Then, the following experiments are carried out by use of the band saw blades having the configurations as shown in FIG. 8(*a*) to FIG. 10. Results are shown in (Table 1) in FIG. 11. Here, assuming that time of the band saw blade of sample 1 having the configuration shown in FIG. 9 is expressed by 1.00 H as reference time, the rest of band saw blades have longer lives than 1.00 H.

Experiment Conditions
Band saw machine: HFA400S made by Amada Co., Ltd.
Saw blade guiding portion: Maximum span (400 mm)
Saw blade dimensions: Band width 41 mm, band thickness 1.3 mm, saw blade length 4995 mm
Speed of rotation of saw blade: 80 m/min
Each saw blade is subjected to idle running under the foregoing conditions and the time until breakage of the body portion of the saw blade is measured.

In comparison of a comparative saw blade (a conventional saw blade) with the second example, the time until breakage is extended by increasing the curvature radius of the tooth bottom curved portion (1.09 H→1.50 H).

Further, breakage positions of the comparative saw blade and the second example always are where the tooth bottom straight portions are 0 mm. On the other hand, breakage occurs where the tooth bottom straight portion is small in the third example. However, the time before breakage is further extended (1.50 H→1.84 H) by providing the tooth bottom portion with the straight portion of 0.2 mm or more.

Accordingly, an apparent effect of the band saw blade according to the embodiment of the present invention has been verified.

Figure 12:
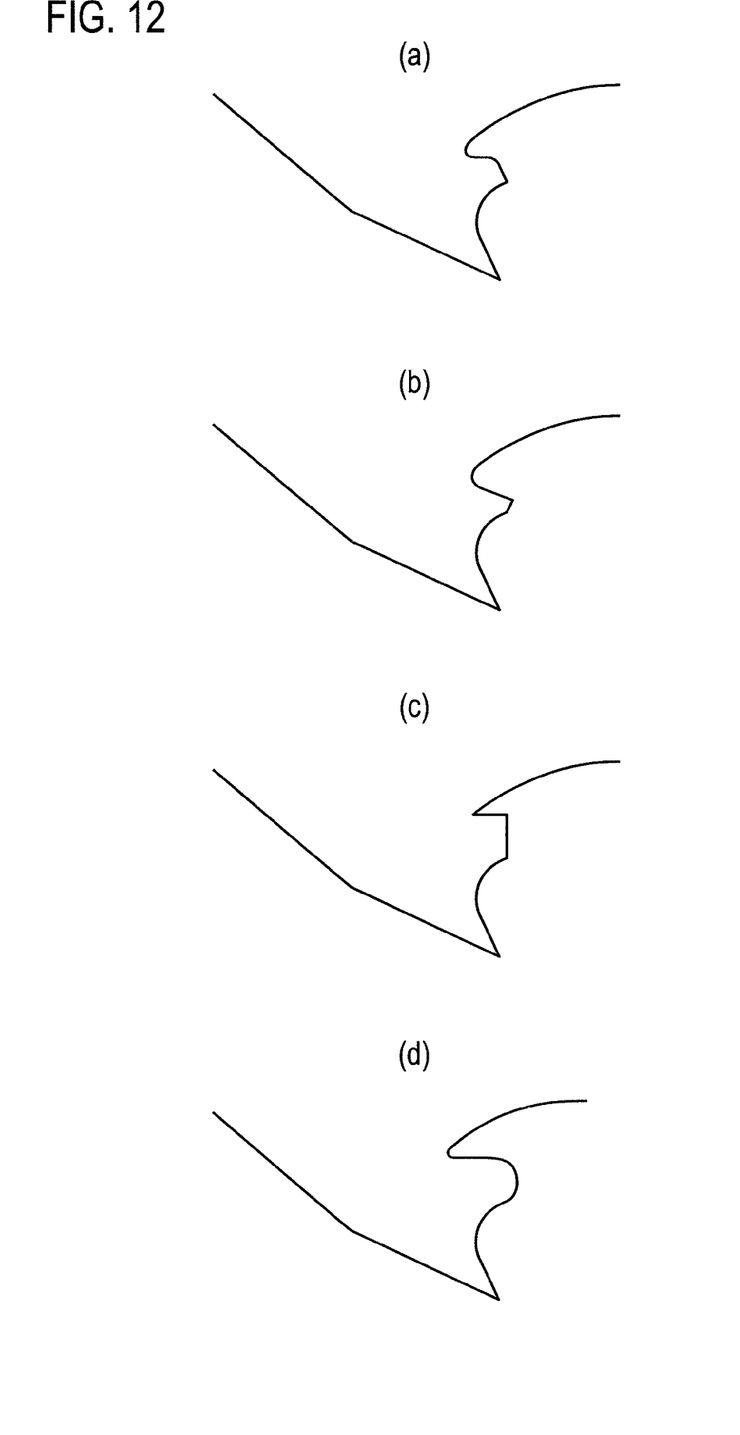
FIGS. 12(a) to 12(d) are explanatory views showing modified aspects of saw teeth.

Incidentally, the first to third examples show only the typical shapes as the saw teeth. However, it is also possible to employ shapes as shown in FIG. 12(*a*) to FIG. 12(*d*) or similar shapes thereto.

Moreover, the variable pitch band saw blade configured to define the pitches between the tooth tips by five types of dimensions is used in the examples. However, the pitches between the tooth tips are not limited only to five types. It is possible to provide any number of types of the pitches or to use an equal pitch band saw blade in which all the tooth tip pitches are equal.

In addition, concerning the setting pattern, the setting pattern including five teeth is used in the examples. However, the number of teeth may be any number other than five and any other setting combination patterns are also usable.

It is to be noted that the entire contents of Japanese Patent Application No. 2008-211592 (filed on Aug. 20, 2008) are incorporated in this specification by reference.

The present invention is not limited only to the explanations of the embodiments of the invention described above, but can be implemented in other various embodiments by making appropriate modifications.

The invention claimed is:

1. A band saw blade comprising:
a plurality of saw teeth including a straight tooth and right and left set teeth; and
a gullet portion provided between the saw teeth, wherein
a rake surface of each of the saw teeth is provided with a chip curler portion formed into an arc shape at an entire range of approximately 90° to form a chip generated at the time of cutting a work into a small rolled shape before the chip comes into contact with a bottom portion of the gullet portion, wherein a radius of the arc shape is set at a range within 10% ±0.5 mm of one of a pitch encompassing the chip curler portion and an average pitch of the band saw blade, and
an intermediate surface is formed to have a flat surface substantially perpendicular to a moving direction of the band saw blade; and
a dent portion is provided between the chip curler portion and the bottom portion of the gullet portion, the dent portion recessed from an end of the chip curler portion in an opposite direction to the moving direction of the band saw blade,
the recessed amount of the dent portion in the opposite direction is approximately equal to a recessed amount of the chip curler portion in the opposite direction.

2. The band saw blade according to claim 1, wherein a flat portion configured to disperse stress concentration is provided at an innermost portion of the gullet portion.

3. A band saw blade comprising:
a plurality of saw teeth including a straight tooth and right and left set teeth; and
a gullet portion provided between the saw teeth, wherein
a rake surface of each of the saw teeth is provided with a chip curler portion formed into an arc shape at an entire range of approximately 90° to form a chip generated at the time of cutting a work into a small rolled shape before the chip comes into contact with a bottom portion of the gullet portion, wherein a radius of the arc shape is set at a range within 10% ±0.5 mm of one of a pitch encompassing the chip curler portion and an average pitch of the band saw blade,
an intermediate surface is formed to have a flat surface substantially perpendicular to a moving direction of the band saw blade between the chip curler portion and the bottom portion of the gullet portion, and
a dent portion is formed between the intermediate surface and the bottom portion of the gullet portion, the dent portion recessed from the intermediate surface in an opposite direction to the moving direction of the band saw blade, the intermediate surface is protruded in the moving direction of the band saw blade from a recessed portion of the dent portion and from a recessed portion of the chip curler portion.

4. The band saw blade according to claim 3, wherein a flat portion configured to disperse stress concentration is provided at an innermost portion of the gullet portion.

5. The band saw blade according to claim 3, wherein the dent portion is provided with a flat surface extending adjacent the intermediate surface and parallel to the moving direction.

6. The band saw blade according to claim 1, wherein the dent portion is provided vertically between the chip curler portion and the bottom portion of the gullet portion, and wherein a reference line, extending perpendicular to the moving direction and passing through a central region of an arcuate recess defined by the arc shape of the chip curler portion, passes through the dent shape portion.

7. The band saw blade according to claim 3, wherein the dent portion is provided vertically between the chip curler portion and the bottom portion of the gullet portion, and wherein a reference line, extending perpendicular to the moving direction and passing through a central region of an arcuate recess defined by the arc shape of the chip curler portion, passes through the dent shape portion.

* * * * *